July 12, 1927.
W. P. HUNT
1,635,848
CONTROL AND FEED FOR BORING AND DRILLING MACHINES, ETC
Filed Aug. 26, 1925
5 Sheets-Sheet 1
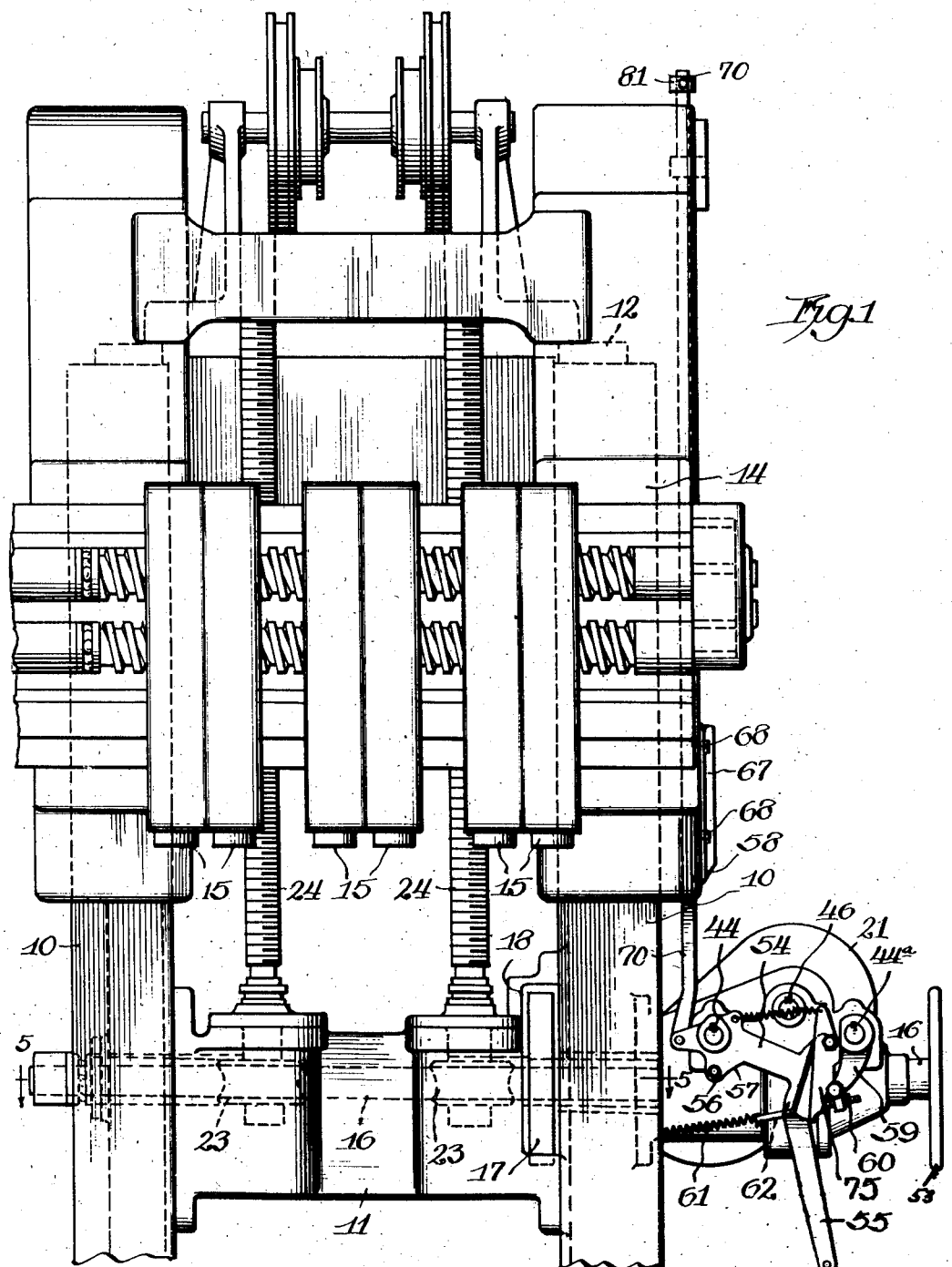

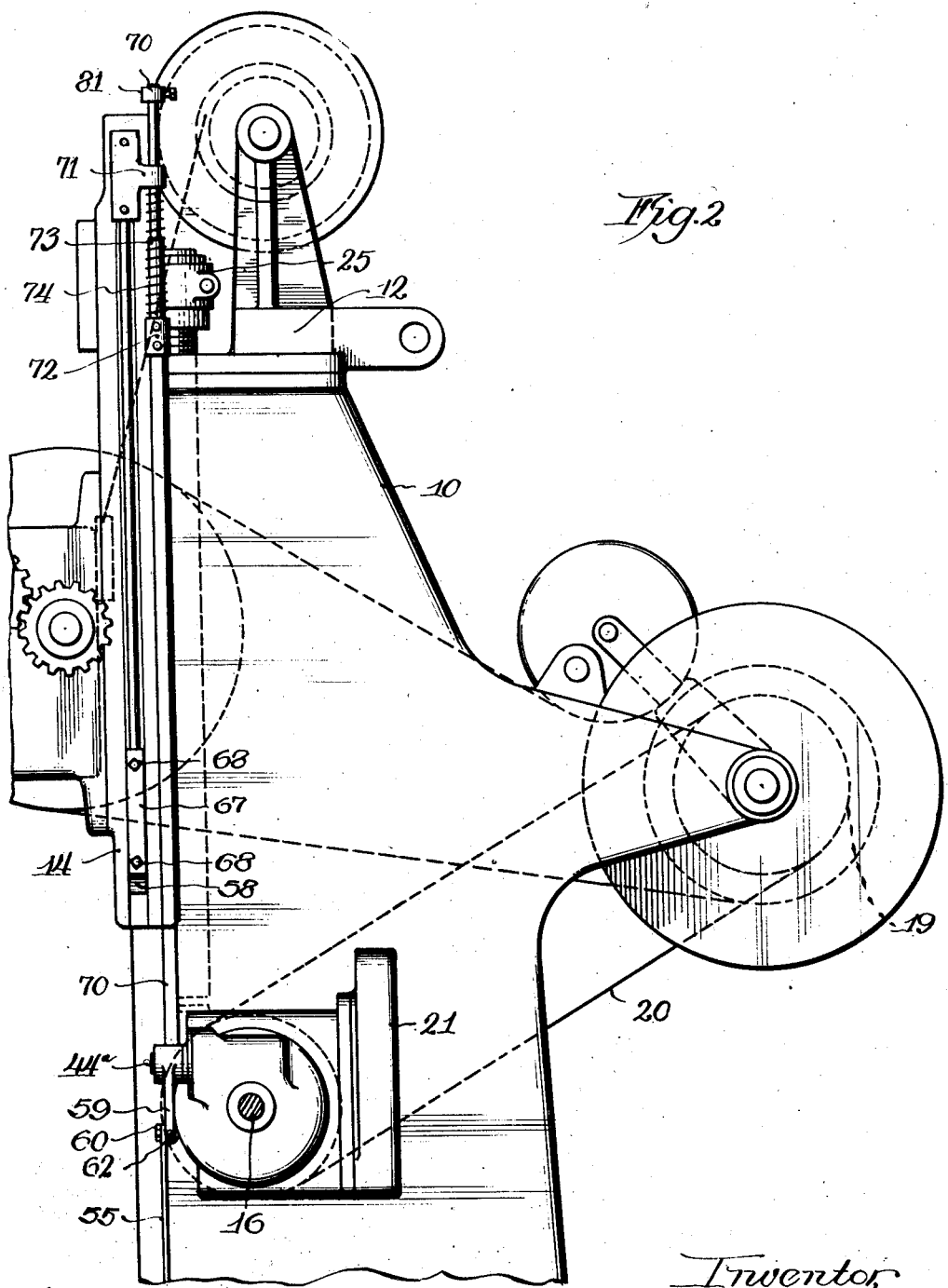

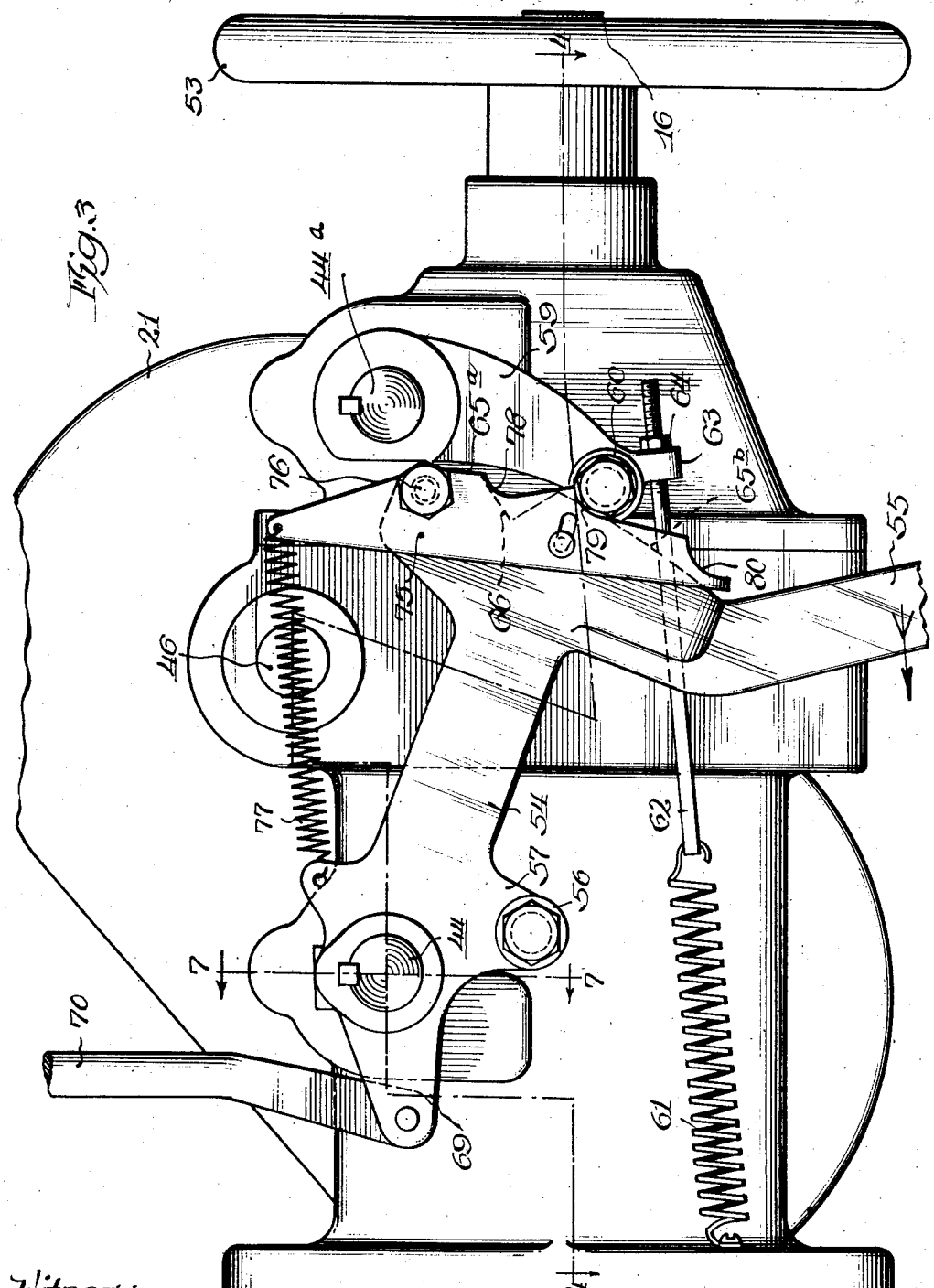

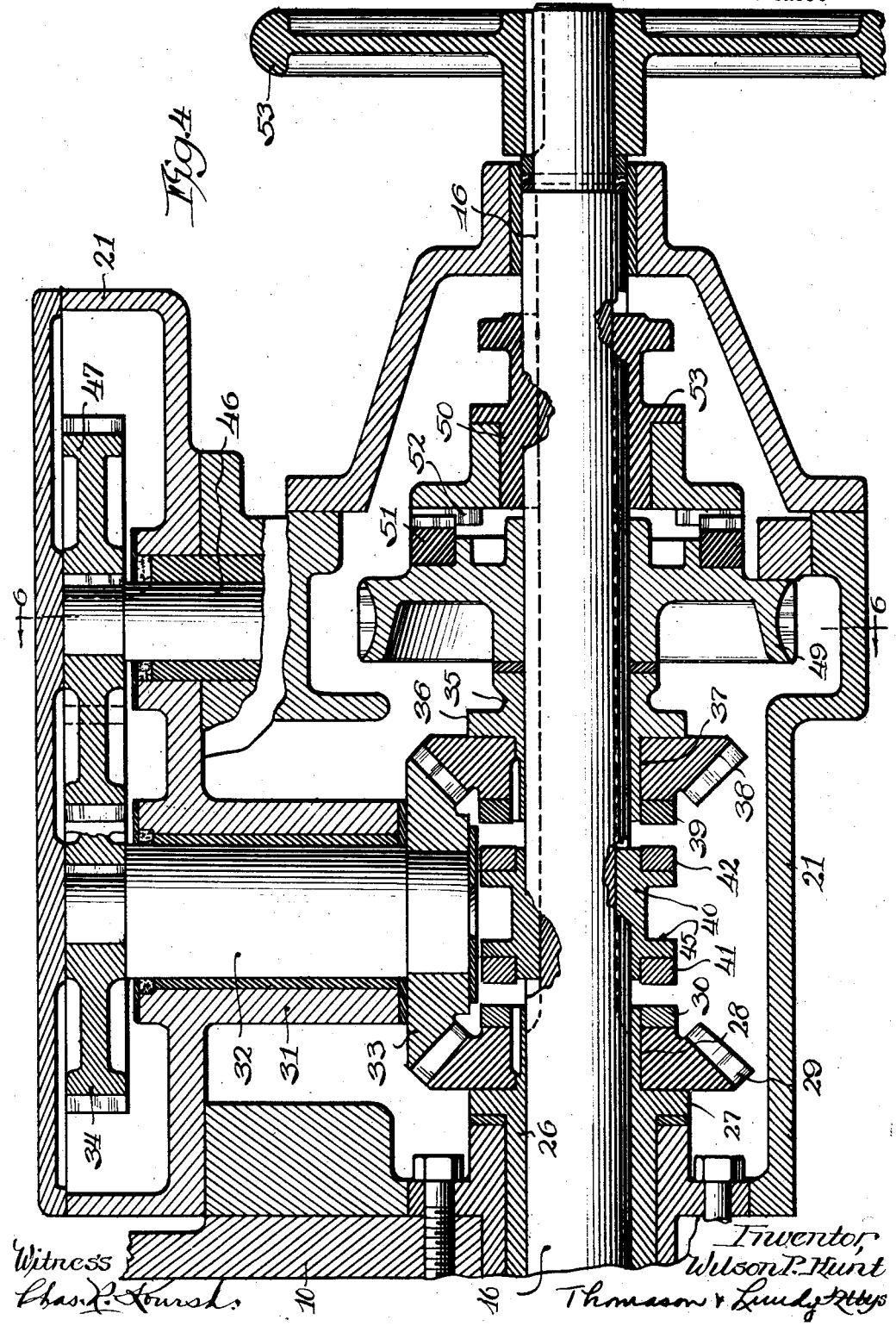

July 12, 1927.
W. P. HUNT
1,635,848
ONTROL AND FEED FOR BORING AND DRILLING MACHINES, ETC
Filed Aug. 26, 1925   5 Sheets-Sheet 5
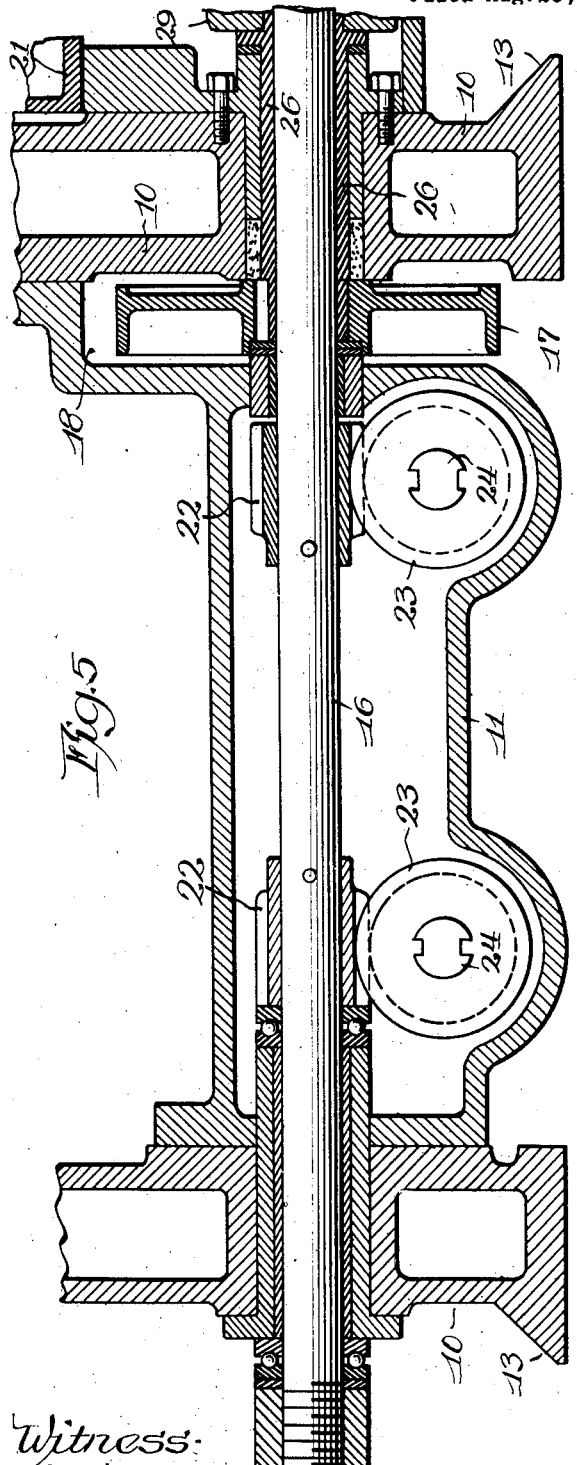
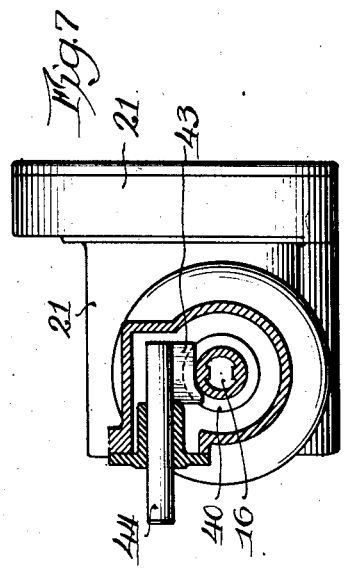
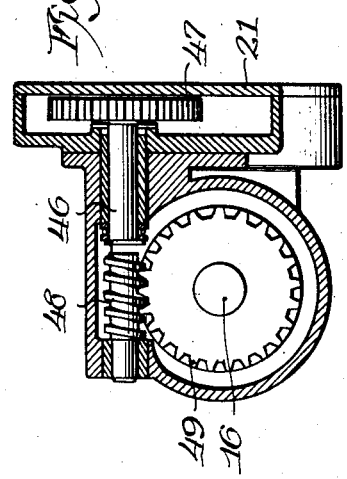
Inventor,
Wilson P. Hunt,
Thomason, Lundy, Attys.

Patented July 12, 1927.

1,635,848

UNITED STATES PATENT OFFICE.

WILSON P. HUNT, OF MOLINE, ILLINOIS, ASSIGNOR TO MOLINE TOOL COMPANY, OF MOLINE, ILLINOIS, A CORPORATION OF ILLINOIS.

CONTROL AND FEED FOR BORING AND DRILLING MACHINES, ETC.

Application filed August 26, 1925. Serial No. 52,573.

My invention relates to machines for boring and drilling and the like, and has more particular reference to means for controlling the movement of the tool or tools to, from and in engagement with the work.

In the present structure I have provided a suitable gearing and a control mechanism therefor so that the tools, which are mounted upon the reciprocable traveler or carrier, may be moved with respect to the object being operated upon, and while shown in connection with a vertically movable carrier, the principles may be utilized in connection with a horizontal or inclined machine. The structure is automatic to the extent that the operator may move a lever to render the structure operative and thereafter the mechanism will move the tools and the carrier downward to the work at high speed; upon reaching the work the feed is operated slowly until the bottom of the bore has been reached, and thereupon the mechanism will return the carrier and the tools to its initial upper position at a high speed. The operator or attendant may then again move the lever to operative position and the foregoing cycle of operation will be repeated. It will be noted that the cycle of operation is entirely automatic from the time the lever is moved and the distance traversed by the tool or tools at the different speeds may be adjusted so as to take care of the work of different sizes and bores of divers depths. The structure is extremely compact so that it does not occupy any considearble space on the machine, and it is made as a unit so that it may be readily attached to a machine already in use.

I prefer to carry out my invention and accomplish the several objects thereof in substantially the manner hereinafter fully described and as more particularly pointed out in the claims, reference being here made to the accompanying drawings that form a part of this specification.

In the drawings:—

Figure 1 is a vertical front elevation of a boring or drilling machine showing my improved control mechanism mounted thereon at the right side of the view.

Figure 2 is a vertical side elevation of the structure illustrated in Figure 1.

Figure 3 is a vertical front elevation of the control unit detached from the apparatus and drawn to a larger scale than shown in Figure 1.

Figure 4 is a substantially horizontal section taken on the irregular line 4—4, of Figure 3.

Figure 5 is a horizontal section on line 5—5, of Figure 1.

Figure 6 is a vertical transverse section on line 6—6, of Figure 4, showing a portion of the gearing for moving the tool after it engages with the work.

Figure 7 is a vertical transverse section on line 7—7, of Figure 3 showing in detail a portion of a clutch and clutch shifting mechanism.

In the drawings, which are schematic and illustrate the typical or preferred embodiment of this invention, I have employed similar reference characters to designate like parts wherever they appear throughout the views.

The machine, as illustrated in Figures 1 and 2, comprises spaced standards 10—10 that are connected intermediate their ends by the hollow cross-head 11 and at their upper portions are connected by a cross-brace 12. The standards are provided upon their outer vertical corners with undercut portions 13 that provide guides or gib-way for the vertically movable carrier 14 on which the spindles 15 are mounted and which drive the boring or drilling tools (not shown). The carrier is adapted to be reciprocated on the guides 13 by suitable mechanism, which forms no portion of this application and which, for the purpose of clearness, is not illustrated or described. The carrier may also be counter-weighted, if desired, in any suitable manner in order to permit its ready operation. The spindles, which carry the tools, are kept in rotation in any desired manner and the carrier is moved to and from the work by means of the mechanism hereinafter explained.

There is a horizontally-disposed rotatable shaft 16 mounted in the hollow cross-head 11, which shaft is actuated through its connection with the pulley 17 that rotates in the recess 18, formed in the right-hand side of the cross-head 11, which pulley derives its motion from the driving pulley 19 through the medium of the belt 20. The cross-head 11 is hollow, as seen in Figure 5, and the shaft 16 extends through bearings in the standards 10 at each end, its right-hand end being extended farther than its opposite end, so that it passes through a detachable housing 21 that encloses the gearing through which the shaft is operated. Intermediate its bearings in the cross-head, the shaft 16 has spaced worms 22 connected to it that are in mesh with worm-gears 23 connected to the lower ends of screw-shafts 24. These screw-shafts 24 are vertically disposed between the standards 10 and their upper ends extend through the internally-threaded bores of blocks 25 projecting from the rear of the carrier, so that when the screw-shafts 24 are rotated in one direction or the other, the carrier 14 will be raised or lowered with respect to the work. The pulley 17 is mounted upon but not directly secured to the shaft 16, and it is keyed upon a sleeve 26 that surrounds the shaft in the bearings in the adjacent standard 10, as seen in Figure 5. The sleeve 26 also projects into the housing 21 a short distance and surrounds the shaft 16, as seen in Figure 4, and it is provided with an annular flange 27 adjacent its end. The diameter of the sleeve is preferably reduced beyond the flange as at 28, and a beveled gear 29 is secured to this reduced portion of the sleeve so that it rotates therewith, and said gear is provided at its hub with a clutch ring or annulus 30, the purpose of which will hereinafter appear.

The housing 21 has an inwardly extending tubular embossment 31 that affords a bearing for a short shaft 32 disposed with its axis horizontal and at a right angle to the axis of the shaft 16 and in the same horizontal plane therewith. A bevelled gear 33 is secured to the end of short shaft nearest shaft 16 and is in mesh with the bevelled gear 29 before mentioned, while at its opposite end the short shaft 32 is provided with a gear 34, that is keyed thereto and rotates continuously with the bevelled gears 33 and 28 and sleeve 26.

A second sleeve 35 surrounds a portion of the shaft 16 beyond the sleeve 26 and is provided with an annular flange 36, corresponding to flange 27 and said sleeve has a reduced portion 37, to which is secured a bevelled gear 38, the teeth of which are in mesh with the teeth of bevelled gear 33 and the hub of which is provided with a clutch ring or annulus 39, the purpose of which will hereinafter more fully appear. A shiftable clutch member 40 is feathered on the shaft 16 intermediate the bevelled gears 29 and 38, so that it may be moved longitudinally on the shaft from gear 29 to gear 38, and the transverse faces of the clutch member 40 adjacent the respective gears are provided with clutch teeth or rings 41 and 42 respectively. It will be understood, the clutch member 40 may be shifted longitudinally upon shaft 16 to bring the clutch members 40 and 42 into engagement with the clutch members 30 and 39 of the respective gears, so that when said clutch member is moved to the gear 29, the shaft 16 will be rotated in one direction so as to move the carrier up (or down as the case may be) and when moved into engagement with gear 38, the direction of rotation of shaft 16 is reversed and the carrier is moved in the opposite direction. The shifting of the clutch member is accomplished by means of a longitudinal fin or blade 43 upon the adjacent end of the rock-spindle 44 that is journaled in an adjacent portion of the housing 21, which web 43 enters the circumferential channel 45 in the clutch member 40, and the rocking of the spindle 44 is accomplished automatically by the mechanism that will later be described.

With the structure hereinbefore described, the carrier may be moved in an upward or downward direction at a given speed. This speed is employed for moving the carrier to the work and away from the same and, of course, may be at a much higher speed than is desirable during the period that the tools are in engagement with the work and, therefore, in order to reduce the speed of movement of the carrier while operating on the work, I have devised the following described mechanism. There is a short shaft 46 journaled in horizontal bearings in the housing 21, one end of which shaft 46 has a pinion 47 secured to it that is in mesh with the pinion 34 on the short shaft 32, and the axis of said shaft 46 is in a plane slightly above the plane of the axis of shaft 32. The opposite end of shaft 46 is provided with a worm 48 that meshes with and drives a worm wheel 49 that is loosely mounted upon the shaft 16. When the clutch member 40 is in neutral position between the bevelled gears 29 and 38 (Figure 4) the worm wheel 49 may be positively connected to the shaft 16 by means of a clutch sleeve 50 keyed or feathered to the shaft 16 in the same manner as the clutch element 40. Said sleeve 50 and the adjacent face of the worm-wheel 49 are provided with counterpart clutch members 51 and 52 (Figure 4) and the sleeve is provided with an annular channel 53 whereby same may be shifted into and out of engagement with worm wheel 49 by means of a shifting device similar to that shown in Figure 7, with an operating rock-spindle 44ª. In order to permit of adjustment or to move the carrier manually, a hand wheel 53 is mounted upon the outer extended end of shaft 16, so that the operator, by releasing the clutches and placing them in neutral positions, may rotate the wheel 53 by hand and move the carrier up or down according to the direction desired.

The mechanism for controlling the shifting of the gears preferably comprises a lever 54 secured to the outer extended end of shaft 44 that has an operating handle 55 extending obliquely downwardly from its end opposite its fulcrum, so that when the handle is moved in the direction of the arrow in Figure 3, the spindle 44 will be rocked and the blade 43 will slide the clutch element 40 (to the left, Figure 4) to connect the beveled gear 29 with the actuating shaft 16, thus causing the carrier to move in a downward direction towards the work. There is a roller 56 mounted upon a lateral member 57 of the lever 54 that will now be in the path of a cam-piece 58 secured to the side of the carrier 14 and in a position to engage the roller 56 thereby moving the lever arm upwardly a slight distance for the next step in the cycle of operation. By adjusting the cam-piece 58 longitudinally up or down upon the carrier the shifting of the lever for the second cycle of operation may be predetermined.

The outer extended end of spindle 44ª is provided with an arm 59 having a roller 60 upon its outer end and said arm is urged in one direction by means of the coiled contraction spring 61 that has one end secured to a portion of the casing or housing 21 and the opposite end connected to the adjusting rod 62. This adjusting rod passes through a lug 63 on the lower end of the arm 59 and its extended end is threaded to receive an adjusting nut 64 that bears against the adjacent face of the lug due to tension of spring 61. The adjacent portion of the lever 54 is provided with a cam face which consists of an arc or segmental portion 65 that is concentric to the axis of movement of the lever and intermediate its ends this segmental portion is provided with a notch 66 into which the roller 60 will be moved at the proper time. The cam-piece 58 is in the form of an angle bar 67 that is adjustably secured to the carrier by bolts or the like 68 and when the carrier has moved downwardly far enough to permit this cam-piece to engage the roller 56 on the lever it will force the roller away from the carrier, thus moving the lever 54 upwardly a distance sufficient to cause the roller 60 to move off the upper cam edge 65ª into the groove or notch 66. This movement of the lever 54 returns the clutch element 40 to neutral, thus disengaging the shaft 16 from the bevelled gear 29 and the spring 61 pulls the arm 59 into the notch 66, causing a rocking of the spindle 44ª, which throws the clutch member 50 toward the worm wheel 49, thus connecting the latter to the shaft 16, and, through the instrumentality of the worm 48, the gears 47 and 34, and the intermediate elements connected with the pulley 17, will cause the driving mechanism to actuate the shaft 16 at a materially reduced speed. This is during the period that the work is being operated upon by the tools on the spindles 15.

After the tools have completed their operation and have moved to the bottom of the bore in which they are operating, it is desirable to withdraw the tools at a rapid speed and return them to their initial positions. Therefore, it is necessary to disconnect the clutch member 50 from the worm wheel and shift the clutch element 40 into operative engagement with the bevelled gear 38, which will rotate the shaft 16 in a direction the reverse of that in which it has been previously rotating. This is accomplished by the following mechanism:—the lever 54, beyond its fulcrum, is provided with an extension 69 in the end of which is pivotally mounted the lower end of a vertically disposed rod 70. This rod extends up above the upper portion of the carrier 14 and is guided in a stop lug 71 adjustably secured to the adjacent side of the carrier and at a convenient point below said stop lug the rod 70 has an adjustable collar 72 secured to it. Surrounding the rod above the collar 72 is a tube or sleeve 73 that is loosely placed thereon and rests at its lower end upon the upper face of the collar 72. When the stop lug 71 comes into engagement with the upper end of the sleeve 73, it will force the rod 70 downwardly, thus moving the lever 54 upwardly and causing the roller on the arm 59 to move out of the notch 66, which disengages the clutch 50 from the worm gear 49 and a further rocking of the spindle 44, so that the clutch element 40 is moved to the right (Figure 4) to connect the shaft 16 with the reverse bevelled gear 38. It is desirable to cause a quick or sudden action of the lever 54, and in order to accomplish this, there is a coiled expansion spring 74 placed around the sleeve 73 and it is long enough to extend above the upper end thereof, so that when the carrier is feeding down the stop 71 compresses the spring 74 on the rod 70, but the spring is not sufficiently stiff to move the rod on account of the pressure of roller 60 in the notch 66, but when the stop 71 strikes the upper end of the sleeve 73 the positive action of the mechanism forces the roller 60 out of the notch 66. There is a collar 81 adjustably secured to the upper portion of the rod 70 which is engaged by the lug 71 when the carrier reaches the upward limit of its movement which throws the clutch member 40 into neutral and stops the upward travel of the carrier.

For the purpose of assisting in maintaining the roller 60 in its several relations with respect to the cam-face of the lever 54, I have provided a trigger in the form of a plate 75 pivoted on the lever 54 by the bolt 76 and yieldingly urged toward the roller 60 by means of the coiled contraction spring 77, that connects the upper end of the plate beyond its pivot, to the lever adjacent the fulcrum of the latter. Notches 78, 79 and 80 are provided in the edge of the trigger plate to be respectively engaged by the roller 60, the lowermost notch 80 being somewhat deeper than the others and located at the end of the trigger plate 75.

It will be understood that the initial or stopped position of the carrier is at the upper limit of its movement, designated in Figs. 1 and 2, and that the drive shaft is in continuous operation while the tools are disengaged from the work. To start a cycle or operation the attendant swings the handle 55 to the left (Figs. 1 and 3) which moves lever 54 to its lowest limit in which position roller 56 on the lever will be in a position to be engaged by the cam piece 58 adjustably mounted on the carrier and the roller 60 will be in the notches 66 and 78. In this position the clutch will have been shifted to the position to drive the carrier rapidly down to the work. Upon the cam piece 58 striking roller 56 the lever 54 is raised slightly which positions the roller 60 in the trigger notch 79 and shifts the clutch mechanism to the slow drive so that further downward movement of the carrier is at a materially reduced speed. This takes place just as the tools reach the work and the slow movement of the carrier continues until the bottom of the bore or end of the work is reached. At this point, stop 71 has compressed the spring 74 and comes into contact with the sleeve 73, and moves the rod 70 downward. This downward movement of the rod 70 further moves the lever 54 upward causing another shifting of the clutch mechanism into reverse at a high speed and the carrier is moved upwardly withdrawing the tools from the work and returning the carrier to its initial position. When the carrier stop 71 on the carrier strikes the collar 81 at the top of the rod 70 the clutch is shifted to neutral and the driving mechanism ceases to move the carrier.

What I claim is:—

1. In control mechanism for reciprocable tool carriers or the like, a shaft, means for rotating said shaft and reversing the same, separate means for rotating the shaft at a reduced speed, clutches for operatively connecting both of said means to the shaft and having spindles extending laterally therefrom, a lever mounted on one of said spindles, a lateral member thereon, engaged by a part of the carrier when the latter has moved a pre-determined distance, a rod connected to said lever, stops on the carrier and rod for actuating the latter, and a coiled spring surrounding said rod and supported by the stop on the latter, said spring adapted to be engaged and compressed by the stop on the carrier whereby to move the lever.

2. In control mechanism for reciprocable tool carriers or the like including a pair of clutches having operating spindles and adapted to reverse the direction and reduce the speed of movement of the carrier, a lever secured to and extending laterally from one of said spindles, an arm secured to and extending laterally from the other spindle, a cam face on said lever engaged by said arm whereby the clutch controlled to said arm is actuated, a latch device on said lever for maintaining the same in different positions, a cam member projecting from the carrier and adapted to engage the lever to move the latter far enough to actuate said arm, and separate devices co-operating with said carrier and lever whereby the latter is moved to return said arm to its normal position.

3. In control mechanism for reciprocable carriers, a pair of clutch devices, a pair of rock spindles each connected to a respective clutch device, a lever secured to one of said spindles, an arm secured to the other spindle, said lever having a segmentally-shaped portion engaged by said arm and provided with a recess that is entered by an adjacent portion of said arm, a reciprocable carrier, a portion of which is movable past said lever and adapted to engage the latter to move the same a distance sufficient to cause said arm to enter the recess and thereby operate its clutch, and a rod connected to said lever and moved longitudinally by a portion of said carrier whereby said lever is oscillated to rock its spindle and operate its clutch.

4. In control mechanism for reciprocable tool carriers and the like including a shaft and gearing for rotating said shaft in opposite directions and for reducing the speed of movement of said shaft, a clutch co-acting with said rotating and reversing gears, a second clutch co-acting with said reduced speed gears, a rock-spindle for each clutch, an arm secured to the spindle of the second clutch, a lever secured to the other spindle and engaged by said arm to control the movement of the latter and the clutch actuated thereby, a latch for maintaining said lever in different positions, a rod connected to said lever and extending adjacent said carrier, stops on said carrier and rod, a spring interposed between said stops, and a sleeve surrounding said rod above the stop thereon and adapted to be engaged by the stop on the carrier to actuate said rod and the lever after said carrier stop has compressed said spring.

Signed at Moline, in the county of Rock Island, and State of Illinois, this 17th day of August, 1925.

WILSON P. HUNT.